US009542298B2

(12) United States Patent
Bates et al.

(10) Patent No.: US 9,542,298 B2
(45) Date of Patent: Jan. 10, 2017

(54) REDUCING RESOURCE OVERHEAD IN VERBOSE TRACE USING RECURSIVE OBJECT PRUNING PRIOR TO STRING SERIALIZATION (71) Applicant: International Business Machines Corporation, Armonk, NY (US)

(72) Inventors: Sterling W. Bates, Austin, TX (US); Christopher M. Laffoon, Durham, NC (US); William A. Parvin, Fuquay Varina, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 14/326,203

(22) Filed: Jul. 8, 2014

(65) Prior Publication Data
US 2016/0011957 A1 Jan. 14, 2016

(51) Int. Cl.
*G06F 11/00* (2006.01)
*G06F 11/34* (2006.01)
*G06F 11/30* (2006.01)
*G06F 11/36* (2006.01)

(52) U.S. Cl.
CPC ......... *G06F 11/3466* (2013.01); *G06F 11/302* (2013.01); *G06F 11/3476* (2013.01); *G06F 11/3636* (2013.01); *G06F 11/3664* (2013.01)

(58) Field of Classification Search
CPC ..... G06F 11/36; G06F 11/362; G06F 11/3668; G06F 11/3636; G06F 17/40; G06F 17/30569; G06F 8/24; G06F 8/38
See application file for complete search history.

(56) References Cited

U.S. PATENT DOCUMENTS

| 4,905,204 A | * | 2/1990 | Hughes | G01V 1/362 367/38 |
| 5,357,626 A | * | 10/1994 | Johnson | G06F 9/3877 703/28 |
| 5,408,650 A | * | 4/1995 | Arsenault | G06F 11/323 345/502 |
| 5,450,575 A | * | 9/1995 | Sites | G06F 11/3604 714/38.1 |

(Continued)

OTHER PUBLICATIONS

List of IBM Patents or Patent Applications Treated As Related.
(Continued)

*Primary Examiner* — Bryce Bonzo
*Assistant Examiner* — Jeison C Arcos
(74) *Attorney, Agent, or Firm* — Patterson + Sheridan, LLP (57) ABSTRACT

Embodiments describe techniques for reducing resource overhead in verbose trace operations by recursively pruning object data prior to string serialization. According to one embodiment, a trace operation is initiated. The trace operation generates a string and specifies one or more objects to serialize and append to the string. At least one object is a nested object. The trace operation recursively parses the nested object while generating the string. Data associated with one or more of the objects to prune from the serialization is determined based on a current prioritization level. The one or more objects is serialized into the string.

11 Claims, 5 Drawing Sheets

(56) References Cited

U.S. PATENT DOCUMENTS

| | | | | |
|---|---|---|---|---|
| 6,604,210 B1* | 8/2003 | Alexander, III | G06F 11/3636 | 714/39 |
| 6,678,883 B1* | 1/2004 | Berry | G06F 11/3636 | 714/45 |
| 6,862,711 B1* | 3/2005 | Bahrs | G06F 8/38 | 715/205 |
| 7,318,017 B2* | 1/2008 | Swoboda | G01R 31/31705 | 370/394 |
| 7,770,181 B2 | 8/2010 | Snover et al. | | |
| 8,583,829 B2 | 11/2013 | Natchetoi et al. | | |
| 2002/0178403 A1* | 11/2002 | Floyd | G06F 11/348 | 714/39 |
| 2004/0073838 A1* | 4/2004 | Tabe | G06F 11/3636 | 714/29 |
| 2004/0103349 A1* | 5/2004 | Nardini | G06F 11/3636 | 714/39 |
| 2004/0153836 A1* | 8/2004 | Nardini | G06F 11/3636 | 714/39 |
| 2005/0028145 A1* | 2/2005 | Kang | G06F 11/3636 | 717/128 |
| 2005/0097110 A1* | 5/2005 | Nishanov | G06F 17/30569 | |
| 2005/0268177 A1* | 12/2005 | John | G06F 11/3471 | 714/47.1 |
| 2006/0150023 A1* | 7/2006 | Hasebe | G01R 31/31705 | 714/38.1 |
| 2006/0248397 A1* | 11/2006 | Johnsen | G06F 11/3652 | 714/30 |
| 2007/0283338 A1* | 12/2007 | Gupta | G06F 11/36 | 717/154 |
| 2009/0019220 A1 | 1/2009 | Davis | | |

OTHER PUBLICATIONS

Bates et al.; "Reducing Resource Overhead in Verbose Trace Using Recursive Object Pruning Prior to String Serialization"; U.S. Appl. No. 14/622,563, filed Feb. 13, 2015.

* cited by examiner

REDUCING RESOURCE OVERHEAD IN VERBOSE TRACE USING RECURSIVE OBJECT PRUNING PRIOR TO STRING SERIALIZATION

BACKGROUND

Effective software trace is a valuable technique used to identify defects in a computer system. An example of where software trace is particularly useful is with computer appliances. A computer appliance is a discrete hardware device that is designed to provide specific computing tasks. Computer appliances include integrated firmware configured to perform the specified tasks. For example, the DataPower and PureApplication line of appliances from the International Business Machines Corporation (IBM) provide customers with security, control, integration, and access for a variety of workloads and services. Generally, hardware and software components of a computer appliance are configured before being delivered to a customer. Further, appliances generally do not allow the customer to reconfigure the hardware or software components. Because a computer appliance is typically a closed system, developers often configure the appliance to perform verbose tracing. Doing so allows the appliance to capture information that the developers need to identify defects or other performance issues.

SUMMARY

Embodiments presented herein provide a method for generating log data for a trace operation during execution of an application on a computing system. The method may generally include initiating a trace operation. The trace operation generates a string. Further, the trace operation specifies one or more objects to serialize and append to the string. At least one object is a nested object. The trace operation recursively parses the nested object while generating the string. The method may also include determining data associated with one or more of the objects to prune from the serialization based on a current prioritization level. The method may also include serializing the one or more objects into the string.

Another embodiment includes a system having a processor and a memory storing a program, which, when executed on the processor, performs an operation for generating log data for a trace operation during execution of an application on a computing system. The operation may generally include initiating a trace operation. The trace operation generates a string. Further, the trace operation specifies one or more objects to serialize and append to the string. At least one object is a nested object. The trace operation recursively parses the nested object while generating the string. The operation may also include determining data associated with one or more of the objects to prune from the serialization based on a current prioritization level. The operation may also include serializing the one or more objects into the string.

Still another embodiment includes a computer program product comprising a computer-readable storage medium having computer-readable program code embodied therewith, the computer-readable program code configured to perform an operation for generating log data for a trace operation during execution of an application on a computing system. The operation may generally include initiating a trace operation. The trace operation generates a string. Further, the trace operation specifies one or more objects to serialize and append to the string. At least one object is a nested object. The trace operation recursively parses the nested object while generating the string. The operation may also include determining data associated with one or more of the objects to prune from the serialization based on a current prioritization level. The operation may also include serializing the one or more objects into the string.

DETAILED DESCRIPTION

Several issues arise from verbose tracing. For example, generating trace statements may require a significant amount of memory. Specifically, trace entries may include references to numerous objects. Further, the objects themselves may be nested with other objects. Thus, serialized string output resulting from a particular trace statement may be large. Another issue is that individual trace statements vary in size depending on the scale of a given customer's computing environment. For instance, if the customer deploys an appliance in an environment that produces a significant amount of workload (e.g., such as in a large datacenter), then generating trace statements may put a large storage and performance burden on the appliance.

Embodiments presented herein describe techniques for reducing resource overhead when performing a trace operation in a system, such as a computing appliance. More specifically, embodiments provide a logging component configured to recursively and selectively prune object data to generate trace output. In one embodiment, object metadata specifies prioritization levels of information for a given object type. For example, in a computer appliance, an amount of processors may be categorized in a higher prioritization level than performance statistics of each processor.

In one embodiment, the logging component includes a configurable maximum string length for a trace output string. The threshold specifies a maximum length of a particular output string generated by a trace statement executed along with program code. When the appliance encounters a trace statement during execution, the logging component identifies each object and object type within the statement. Because the objects may be parents of child objects, the logging component iterates through each parent object and obtains relevant data for the trace output string until the maximum string length is reached.

The logging component may iterate through a given object type multiple times. At each iteration, the logging component may apply a pruning strategy that progressively filters information being written to a log by the trace statement based on a priority level. For example, at a first encounter of a given object type, the logging component may apply a straightforward truncation approach based on the maximum string length. That is, the logging component may collect information of the parent object and any child objects until the maximum string length is reached. Even if the logging component does not completely iterate through the entire tree of a given parent object, the logging component nevertheless generates a serialized string of whatever data has been collected. However, at the next iteration of the object type, the logging component may prune the data, as identified by the specified priority levels for that object type. The logging component may continue until an entire object of that type is fully processed. By doing so, the logging component effectively learns what levels need to be pruned for a given object type to process an entire object and remain within a specified maximum string length, if possible.

Once the logging component reaches the maximum string length for a given trace statement, the logging component stops processing the statement and persists the resulting string to storage. Selectively pruning object data being written to a string based on the importance of the data within the objects during a verbose trace yields several advantages. For instance, limiting the length of string output to a number of characters specified in a threshold limits resource overhead (e.g., memory and CPU consumption) compared to generating an output string corresponding to an entire object tree. Further, recursively iterating through an object tree and obtaining data based on priority levels allows relatively important data to be included into the output string. Doing so allows trace output to have meaningful information for developers to use in fixing any system defects or bugs.

Note, the following description uses a computer appliance as a reference example of a system configured to recursively and selectively prune object data during a verbose trace operation. However, one of skill in the art will recognize that embodiments may be applicable to a number of contexts related to logging system runtime information. For example, embodiments may be used in debugging tools of various types of computer systems, such as network servers, mobile devices, and the like. These systems may be configured to verbosely log system activity during execution using the techniques described herein.

Figure 1:
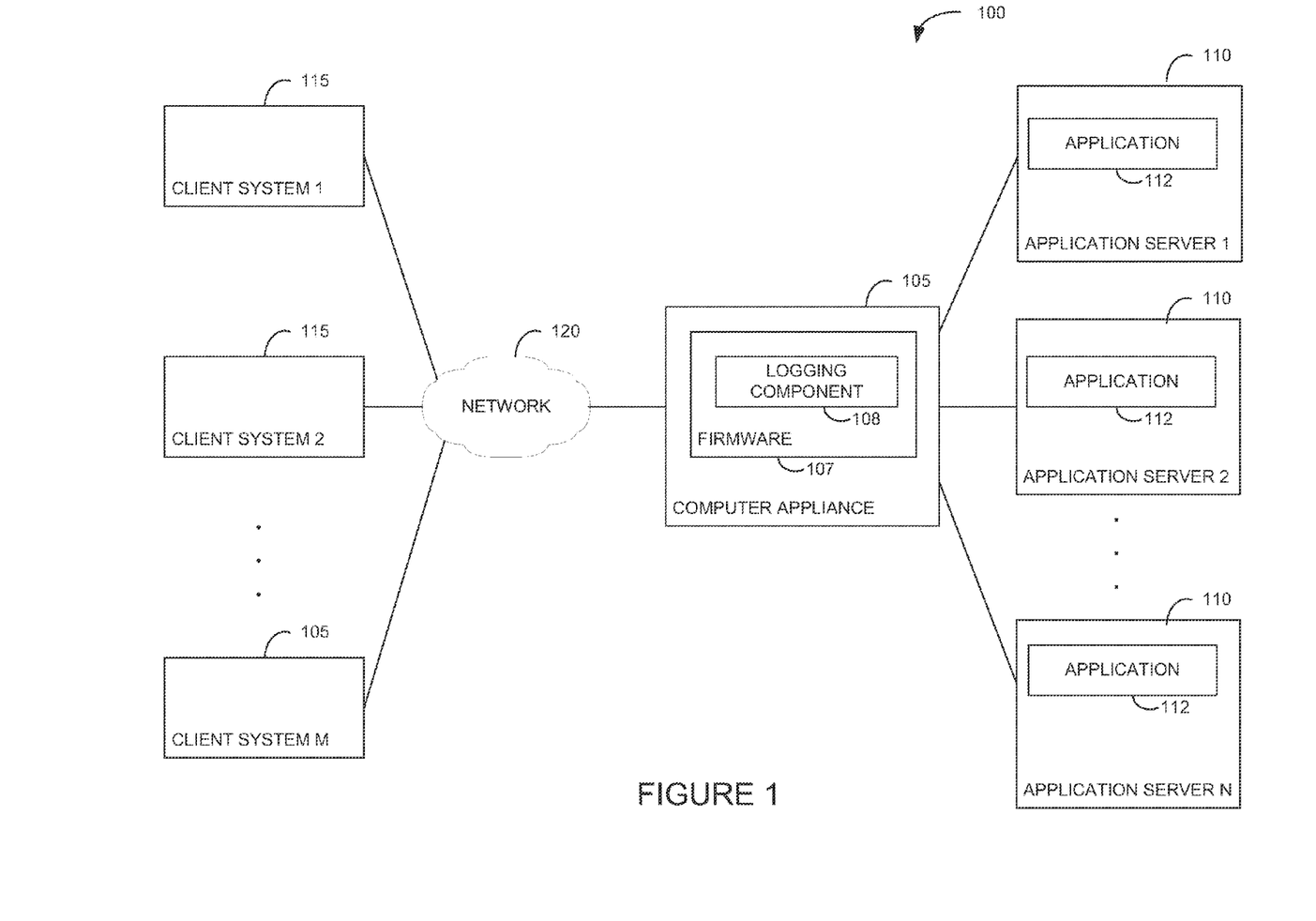
FIG. 1 illustrates an example computing environment, according to one embodiment.

FIG. 1 illustrates an example computing environment 100, according to one embodiment. As shown, computing environment 100 includes a computer appliance 105, multiple application servers 110, and multiple client systems 115. The application servers 110 provide the client systems 115 with access to an application 112, via a network 120.

In one embodiment, the computer appliance 105 is a closed computing system that performs specific tasks for the application servers 110. In this context, the computer appliance 105 is a gateway appliance that provides various security capabilities. For example, the computer appliance 105 may be connected to the network 120 and manage authentication and authorization operations between the application servers 110 and the client systems 115. The computer appliance 105 includes firmware 107. The firmware 107 is software integrated with the hardware of the computer appliance 105. Further, the firmware 107 includes various modules that are configured to perform the tasks of the computer appliance 105.

Because the computer appliance 105 is a closed appliance that is generally not configurable by customers, the firmware 107 performs verbose trace operations at numerous points of execution to capture data used by developers to troubleshoot appliance operation or identify and correct programming "bugs" in the application code of the computer appliance 105. The points of execution may be indicated by trace entries that include references to objects in the code. As is known, objects are collections of data and operations that, at runtime, have states during program execution. Serialization is the process of writing information from such states to a string. The objects provide data that may correspond to various parameters within the computer appliance 105. Examples of objects may be maps and lists. Further, objects may be nested. That is, objects may have arranged as parent-child. Specifically, an object may be a parent to a particular child object. Further, a child object may be a parent to other objects, as well. As an example, a list object may be a parent to one or more map objects, and the map objects themselves may be parent to a variety of list and map objects.

The firmware 107 includes a logging component 108 that generates string output for trace statements executed in program code. When the firmware 107 reaches a trace statement during execution, the logging component 108 recursively iterates through nested objects identified in the entry and applies pruning strategies based on defined priority levels to collect object data. The logging component 108 places object data into a string buffer and outputs the string after a certain string length is reached.

Further, the pruning strategies may be based on configurable prioritization levels of each object. Specifically, a developer may define priorities for data to be logged about an object. Metadata associated with a given object may specify degrees of importance of information. For instance, prioritization levels may specify that processor load information specified by a given object may be prioritized higher than other performance statistics specified by the same object. A pruning strategy based on such prioritization levels may prune the less important object data at a first iteration of a given object type.

Figure 2:
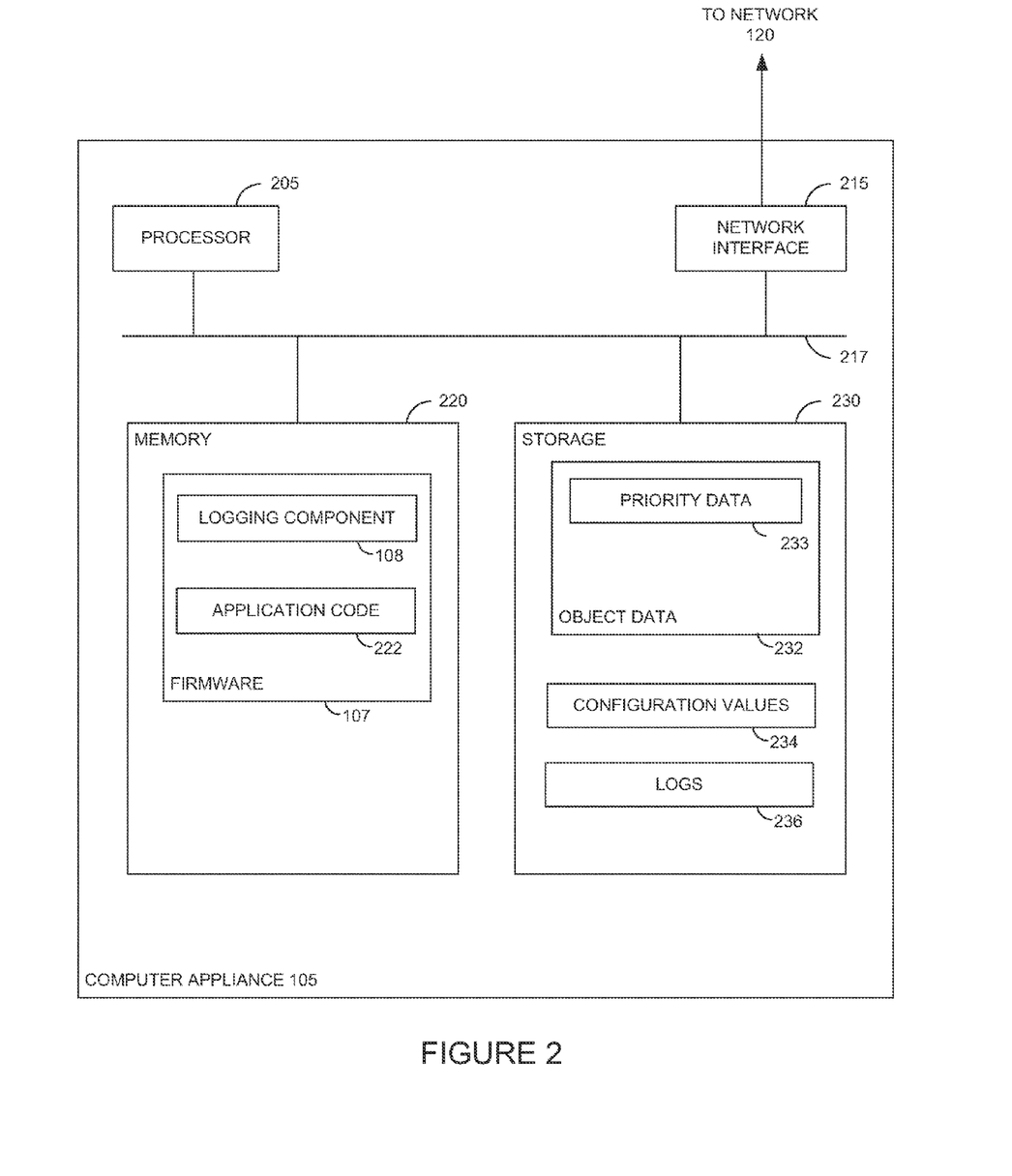
FIG. 2 illustrates an example computer appliance configured to perform trace operations by recursively pruning object data, according to one embodiment.

FIG. 2 further illustrates the computing appliance 105, which is configured to perform verbose trace operations using recursive object pruning, according to one embodiment. As shown, the computing appliance 105 includes, without limitation, a central processing unit (CPU) 205, a network interface 215, an interconnect (i.e., bus) 217, a memory 220, and storage 230.

The CPU 205 may retrieve and execute programming instructions stored in the memory 220. Similarly, the CPU 205 may retrieve and store application data residing in the memory 220. The interconnect 217 may facilitate transmission, such as of programming instructions and application data, among the CPU 205, storage 230, network interface 215, and memory 220. CPU 205 is included to be representative of a single CPU, multiple CPUs, a single CPU having multiple processing cores, and the like. Additionally, the memory 220 is included to be representative of a random access memory. Furthermore, the storage 230 may be a disk drive storage device. As shown, the memory 220 includes the firmware 107.

Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN). As shown, the storage 230 includes object data 232, configuration values 234, and logs 236.

The firmware 107 includes application code 222 and the logging component 108. The applications 222 perform security tasks for application servers 110. For example, applications 222 may be modules that authenticate authorize client servers 115 connecting to the application servers 110. Further, the application code 222 may include trace entries at different points of code. The trace entries allow diagnostic information to be collected and logged. To do so, the logging component 108 evaluates such entries when encountered in program code and generates a serialized string to output to logs 236.

Further, when evaluating a trace statement, the logging component 108 recursively inspects object data 232 identified in the statement to incrementally generate the string output. The object data 232 may be categorized by classes of information specified by the priority data 233. The priority data 233 specifies levels of prioritization for the object data 232. The serialized string may be subject to a maximum string length specified by configuration values 234. In one embodiment, the configuration values 234 may specify string lengths based on object. In addition, configuration values 234 may include different thresholds for time and iteration counts. For example, a time threshold may be a maximum time at which the logging component 108 processes a given object tree. A count threshold may specify the maximum amount of times the logging component 108 is able to process a given object. Such thresholds may be used in reducing current prioritization levels, so that data previously set to be pruned may be collected in subsequent iterations.

Figure 3:
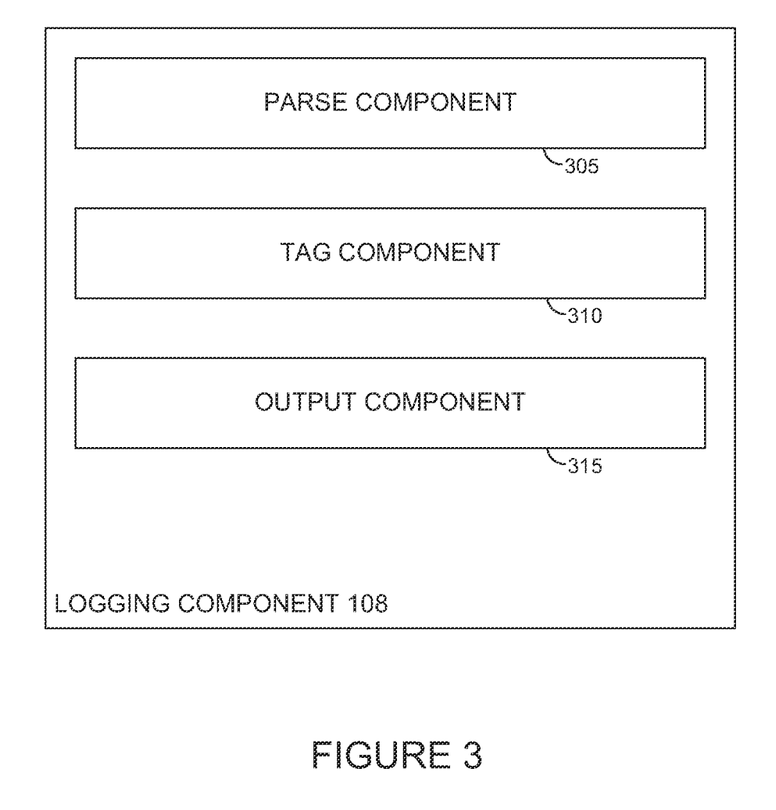
FIG. 3 illustrates a logging component configured to recursively evaluate objects while performing a trace operation, according to one embodiment.

FIG. 3 further illustrates the logging component 108, according to one embodiment. As shown, the logging component 108 includes a parse component 305, a tag component 310, and an output component 315. The parse component 305 iterates through an object tree collecting relevant information to output to a log. The parse component 305 may store the collected information in a string buffer. The parse component 305 may filter certain information from each object based on a determined pruning strategy to apply to the object and a priority level of the information.

The tag component 310 tags trace entries that have previously required pruning in the past. When the logging component 108 reencounters a given trace statement, the parse component 305 begins pruning object data at a certain priority level. For example, assume that the parse component 305 evaluates a trace statement for the first time and applies a pruning strategy and filters information specified by the lowest priority level. Also assume that the parse component 305 reaches a maximum string length before evaluating all objects identified in the trace statement. The tag component 310 tags the trace statement as having been evaluated by the parse component 305. The tag component 310 may also include information regarding the most recent pruning strategy used, whether the parse component 305 parsed the entire object tree before reaching the string length, etc. When the logging component 108 encounters the trace statement and identifies that the statement is tagged with such information, the parse component 305 may apply a more aggressive pruning strategy with the objects involved. For example, the parse component 305 may filter object data at a priority level above what was previously pruned.

The output component 315 retrieves content placed in the string buffer by the parse component 305 and formats the content into a string output statement. The output component 315 then writes the statement to a log file. The output component 315 may persist the log file to storage in the computer appliance. Further, the output component 315 may also transmit the log file to an external system for review.

Figure 4:
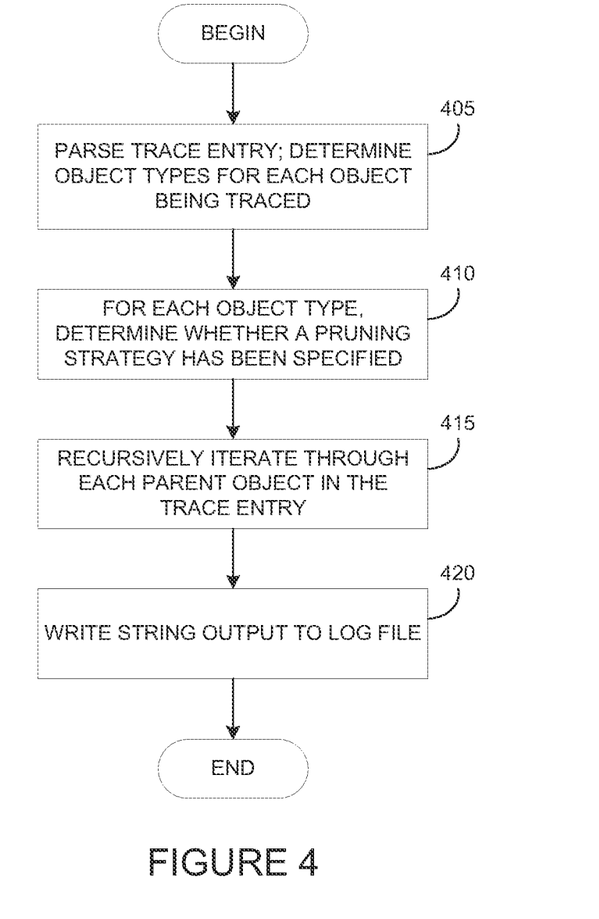
FIG. 4 illustrates a method for performing a trace operation, according to one embodiment.

FIG. 4 illustrates a method 400 for performing a verbose trace operation, according to one embodiment. More specifically, the logging component 108 performs the steps of method 400 each time the firmware 107 encounters a trace statement during execution. Method 400 begins at step 405, where the logging component 108 parses the trace statement. During this step, the logging component 108 determines object types for each object being traced. For instance, consider the following trace statement:

trace.info(test.class, "This is a $ {map} and this is a $ {list}.")

Illustratively, the trace statement above includes two string objects: a map and a list. The logging component 108 serializes the map and list objects to strings before writing the statement to disk. Generally, the logging component 108 iterates through each object until either completing the serialization or reaching the maximum string length.

At step 410, the parse component 305 determines, for each identified object type, whether a pruning strategy has been specified. To do so, the parse component 305 may identify tags associated with the object (or trace statement) that indicate that the parse component 305 had previously evaluated with object type and was unable to complete a trace entry within the maximum string length.

Figure 5:
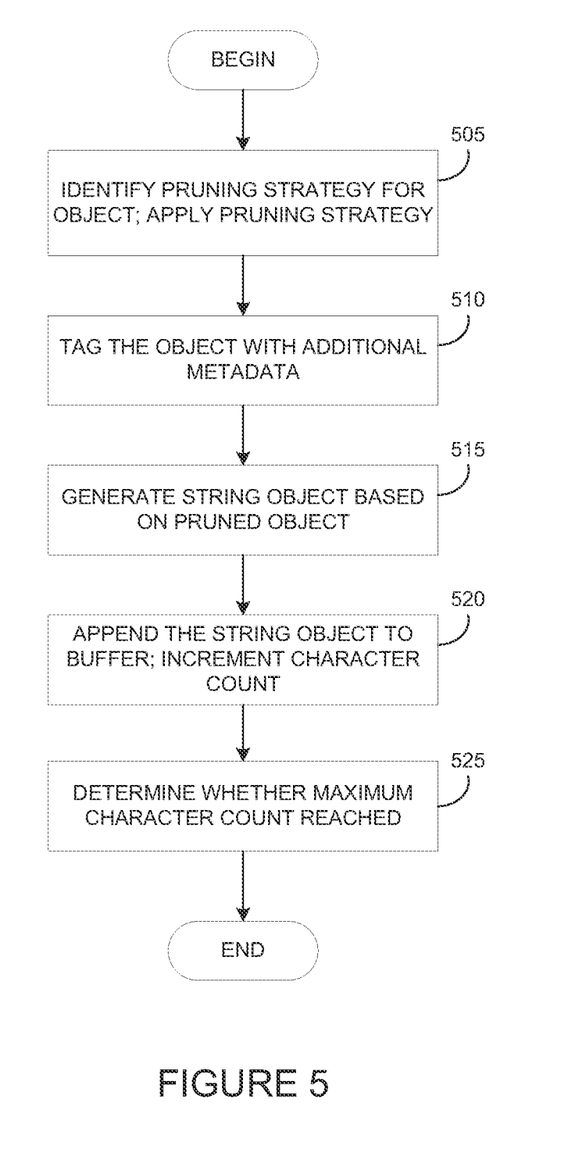
FIG. 5 illustrates a method for parsing a nested object, according to one embodiment.

At step 415, the parse component 305 recursively iterates through each parent object identified in the trace statement. Specifically, the parse component 305 traverses through each object tree and collects as much object data as possible within the specified maximum string length. To do so, the parse component 305 may apply pruning strategies based on the object currently being evaluated. As the parse component 305 captures object data, the parse component 305 writes the data into a string buffer within the memory of the computer appliance 105. FIG. 5 further describes parsing an individual object.

At step 420, once the parse component 305 has completed obtaining object data (whether by completely traversing through the parent object trees or reaching the maximum string length), the output component 315 formats the content stored in the string buffer to a serialized string. The output component 315 then writes the string to disk, e.g., in a log file. The output component 315 may also send the string output to an external system.

FIG. 5 illustrates a method 500 for parsing an object in the object tree. As stated, the parse component 305 iterates through each object tree encountered in the trace statement until completely traversing each object or until the maximum string length is reached. Method 500 begins at step 505, where the parse component 305 identifies the specified pruning strategy for the object. The pruning strategy may be based on priority levels defined in metadata for the object. Further, the pruning strategy may be based on whether the parse component 305 had previously evaluated an object of that particular type. For instance, if the parse component 305 encounters a given object for the first time, the parse component 305 may employ a straightforward approach of evaluating the entire object without any regard for the priority of certain data. On the other hand, if the parse component 305 had previously evaluated an object of the same type, the parse component 305 may apply a different strategy based on how much object data the parse component 305 was previously able to process.

Continuing the previous example, if the parse component 305 was unable to process the entire object during the straightforward collection approach, the parse component 305 may prune data having the lowest priority level. If, at that point, the parse component 305 is unable to process the entire object, the parse component 305 may, in addition, prune data at the next lowest priority level.

At step 510, the tag component 310 also tags the object with additional metadata, such as whether the entire object was processed, the applied pruning strategy, and the like. At step 515, the parse component 305 serializes the pruned object to a string object. At step 520, the parse component 305 appends the string object to the string buffer in the memory of the computer appliance 105. Further, the parse component increments the character count of the string buffer by the amount of characters contained in the serialized string.

At step 525, the parse component 305 determines whether the maximum character count has been reached. If so, the parse component 305 stops processing objects in the trace statement. If not, the parse component 305 continues iterating through the objects identified in the trace statement until completing the task or until the maximum string length is reached. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
    a processor; and
    a memory storing a program, which, when executed on the processor, performs an operation for generating log data for a trace operation during execution of an application on the system, the operation comprising:
        initiating a trace operation, wherein the trace operation generates a string, wherein the trace operation specifies one or more objects to serialize and append to the string, wherein at least one object is a nested object, and wherein the trace operation recursively parses the nested object while generating the string,
        determining data associated with one or more of the objects to prune from the serialization based on a current prioritization level,
        serializing the one or more objects into the string, and
        upon determining that a maximum character length is exceeded while serializing at least one of the one or more objects, decreasing the current prioritization level of the object for subsequent executions of the trace operation.

2. The system of claim 1, wherein performing the trace operation comprises, upon determining a next object has data that is not to be pruned, serializing the next object to the string, until either (i) reaching the maximum character length of the string or (ii) completing the trace operation.

3. The system of claim 1, wherein the current prioritization level indicates any data to prune from serialization during the trace operation based on an object type.

4. The system of claim 1, wherein the operation further comprises, writing the string to a log file.

5. The system of claim 4, wherein the operation further comprises, upon reaching an iteration count threshold for a given object, decrementing the prioritization level for subsequent executions of the trace operation.

6. A computer program product, comprising:
    a computer-readable storage medium having computer-readable program code embodied therewith, the computer-readable program code configured to perform an operation for generating log data for a trace operation during execution of an application on the system, the operation comprising:
        initiating a trace operation, wherein the trace operation generates a string, wherein the trace operation specifies one or more objects to serialize and append to the string, wherein at least one object is a nested object, and wherein the trace operation recursively parses the nested object while generating the string;
        determining data associated with one or more of the objects to prune from the serialization based on a current prioritization level;
        serializing the one or more objects into the string; and
        upon determining that a maximum character length is exceeded while serializing at least one of the one or more objects, decreasing the current prioritization level of the object for subsequent executions of the trace operation.

7. The computer program product of claim 6, wherein performing the trace operation comprises, upon determining a next object has data that is not to be pruned, serializing the next object to the string, until either (i) reaching the maximum character length of the string or (ii) completing the trace operation.

8. The computer program product of claim 6, wherein the current prioritization level indicates any data to prune from serialization during the trace operation based on an object type.

9. The computer program product of claim 6, wherein the operation further comprises, writing the string to a log file.

10. The computer program product of claim 9, wherein the operation further comprises, upon reaching an iteration count threshold for a given object, decrementing the prioritization level for subsequent executions of the trace operation.

11. The computer program product of claim 9, wherein the operation further comprises, upon reaching a time duration threshold for a given object, decrementing the prioritization level for subsequent executions of the trace operation.

* * * * *